United States Patent
Sakurai et al.

(10) Patent No.: US 8,256,797 B2
(45) Date of Patent: Sep. 4, 2012

(54) STEERING WHEEL WITH AIRBAG DEVICE AND METHOD FOR ASSEMBLING THE SAME

(75) Inventors: Koji Sakurai, Aichi-ken (JP); Osamu Hirose, Aichi-ken (JP); Hitoshi Iida, Aichi-ken (JP); Kenji Sasaki, Aichi-ken (JP); Norio Suzuki, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 423 days.

(21) Appl. No.: 12/585,168

(22) Filed: Sep. 8, 2009

(65) Prior Publication Data

US 2010/0066066 A1  Mar. 18, 2010

(30) Foreign Application Priority Data

Sep. 16, 2008  (JP) ................. 2008-236808
Sep. 16, 2008  (JP) ................. 2008-236811
Sep. 16, 2008  (JP) ................. 2008-236813

(51) Int. Cl.
*B60R 21/203* (2006.01)

(52) U.S. Cl. ............. 280/731; 280/728.2; 280/750; 200/61.55

(58) Field of Classification Search ........... 280/731, 280/750, 728.2, 728.1; 200/61.54, 61.55; 74/552; 29/894.1
See application file for complete search history.

(56) References Cited

U.S. PATENT DOCUMENTS

| | | | |
|---|---|---|---|
| 5,333,897 A | | 8/1994 | Landis et al. |
| 6,062,592 A | | 5/2000 | Sakurai et al. |
| 6,086,090 A | * | 7/2000 | Fischer ............... 280/728.2 |
| 6,257,615 B1 | * | 7/2001 | Bohn et al. ............ 280/728.2 |
| 6,312,012 B1 | | 11/2001 | Bohn et al. |
| 6,422,594 B2 | | 7/2002 | Hasebe |
| 6,474,682 B2 | | 11/2002 | Ikeda et al. |
| 6,508,485 B2 | | 1/2003 | Kikuta et al. |
| 6,554,312 B2 | | 4/2003 | Sakane et al. |
| 6,572,138 B1 | * | 6/2003 | Bohn et al. ............... 280/731 |
| 6,592,141 B1 | | 7/2003 | Dancasius et al. |
| 6,616,180 B2 | * | 9/2003 | Schutz ................. 280/731 |
| 6,688,637 B2 | * | 2/2004 | Igawa et al. .......... 280/728.2 |
| 6,719,323 B2 | * | 4/2004 | Kai et al. ............... 280/731 |
| 6,802,531 B2 | * | 10/2004 | Bohn et al. ............. 280/731 |
| 6,837,514 B1 | * | 1/2005 | Fujita et al. ............ 280/731 |

(Continued)

FOREIGN PATENT DOCUMENTS

DE   298 05 207   7/1998

(Continued)

OTHER PUBLICATIONS

Office Action mailed on Feb. 10, 2011 from China Patent Office in the corresponding Chinese Patent Application No. 2009-101729836 (English translation enclosed).

(Continued)

*Primary Examiner* — Paul N Dickson
*Assistant Examiner* — Keith Frisby
(74) *Attorney, Agent, or Firm* — Posz Law Group, PLC

(57) ABSTRACT

A folded airbag is accommodated between a bag holder, to which horn switch mechanisms are secured, and a pad secured to the bag holder. The horn switch mechanisms are installed by being inserted in attachment holes formed in the bag holder. The pad has switch support portions for supporting the horn switch mechanisms.

15 Claims, 10 Drawing Sheets

U.S. PATENT DOCUMENTS

| | | | |
|---|---|---|---|
| 7,118,125 B2 * | 10/2006 | Lee | 280/731 |
| 7,547,042 B2 * | 6/2009 | Chapelain et al. | 280/731 |
| 2001/0003251 A1 * | 6/2001 | Sakurai | 74/552 |
| 2001/0035631 A1 | 11/2001 | Hasebe | |
| 2001/0054810 A1 | 12/2001 | Sakane et al. | |
| 2002/0011721 A1 | 1/2002 | Kikuta et al. | |
| 2002/0079203 A1 * | 6/2002 | Kikuta et al. | 200/61.54 |
| 2002/0079678 A1 * | 6/2002 | Kai et al. | 280/731 |
| 2003/0197355 A1 | 10/2003 | Bohn et al. | |

FOREIGN PATENT DOCUMENTS

| | | |
|---|---|---|
| DE | 198 58 691 | 6/2000 |
| DE | 10 2008 000 224 | 8/2009 |
| JP | 2000052903 A * | 2/2000 |
| JP | A-2001-354101 | 12/2001 |
| JP | 2002166813 A * | 6/2002 |
| JP | A-2004-256078 | 9/2004 |
| JP | A-2004-284414 | 10/2004 |
| JP | A-2006-294379 | 10/2006 |
| JP | A-2007-245928 | 9/2007 |
| JP | A-2007-307954 | 11/2007 |
| JP | A-2008-091048 | 4/2008 |
| JP | A-2009-248666 | 10/2009 |
| WO | WO 2008051117 A1 * | 5/2008 |

OTHER PUBLICATIONS

Office Action mailed Jan. 31, 2012 in corresponding JP application No. 2008-236808 (no English translation).

Office Action mailed Jan. 31, 2012 in corresponding JP application No. 2008-236813 (no English translation).

Office Action mailed Jan. 5, 2012 in corresponding DE application No. 10 2009 041 539.4 (and English translation).

Office Action mailed Jan. 31, 2012 in corresponding JP application No. 2008-236808 (English translation).

Office Action mailed Jan. 31, 2012 in corresponding JP application No. 2008-236813 (English translation).

Office Action mailed Apr. 3, 2012 in corresponding JP Application No. 2008-236811 (and English translation).

* cited by examiner

Fig.8 and Fig.9

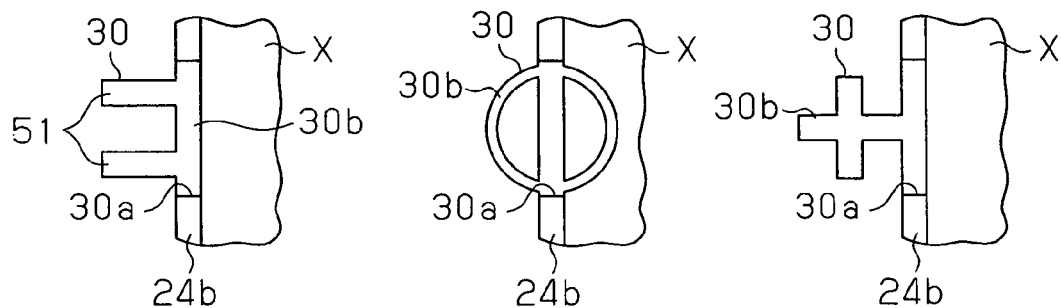
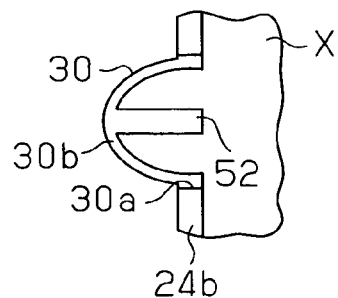
Fig.10A  Fig.10B  Fig.10C
Fig.10D

STEERING WHEEL WITH AIRBAG DEVICE AND METHOD FOR ASSEMBLING THE SAME

BACKGROUND OF THE INVENTION

The present invention relates to a steering wheel having an airbag device (an airbag module) for protecting the head and the part near the head of an occupant seated on the driver's seat of a vehicle, and to a method for assembling the steering wheel.

For example, Japanese Laid-Open Patent Publication No. 2004-256078 discloses a steering wheel with an airbag device that is attached to a steering wheel body fixed to a steering shaft, together with horn switch mechanisms. This type of airbag device has a bag accommodation space for accommodating a folded airbag between a pad having an ornamental surface of the steering wheel and a bag holder attached to the pad. A horn plate is arranged on a side of the bag holder that faces the steering wheel body. The horn plate is secured to a metal core of the steering wheel body. A plurality of horn switch mechanisms are provided between the horn plate and the bag holder. The horn switch mechanisms support the bag holder between the horn plate and the bag holder.

Each of the horn switch mechanisms includes a bolt, an urging member, a movable contact, a fixed contact. The bolt is passed through the horn plate and the bag holder from the steering wheel body. The bolt is then fastened with a nut from a side of the bag holder that faces the pad. The urging members urge the bag holder away from the horn plate, and support the entire airbag device through the bag holder. The movable contacts are provided in the vicinity of the bag holder, and the fixed contacts are provided in the vicinity of the pad. When the pad is pressed toward the steering wheel body, the movable contact of a horn switch mechanism contacts the corresponding fixed contact. This activates the horn of the vehicle. Further, when the vehicle receives impact, gas is generated in an inflator. The airbag breaks open the pad and is instantly inflated and deployed in the vicinity of the vehicle seat. This attenuates the impact received by the driver.

In the above described steering wheel, the airbag device is installed in the steering wheel body together with the horn switch mechanisms. Thus, when the airbag device is installed in the steering wheel body in a pressing manner, or when a user strikes hard against the airbag device, the horn switch mechanisms receive a great load. Therefore, in the above described airbag device, the horn switch mechanisms must be firmly secured, and for example, the horn switch mechanisms are fastened to the steering wheel body with bolts. In other words, the securing structure of horn mechanisms is limited.

In the above described steering wheel, the horn switch mechanisms are located outside the bag accommodation space when viewed from front. This increases the size of the airbag device. To solve this problem, the horn switch mechanisms may be arranged to overlap with the bag accommodation space when viewed from front. However, if this configuration is employed in the steering wheel disclosed in the above document, the distal ends of the bolts and nuts of the horn switch mechanisms largely project into the bag accommodation space. Thus, when the airbag is inflated, the bolt distal ends and angular parts of the nuts can damage the airbag. Therefore, in a conventional airbag device, the horn switch mechanism need to be located outside of the bag accommodation space so that the horn switch mechanism do not hinder inflation of the airbag.

Other than the above document, for example, Japanese Laid-Open Patent Publication No. 2004-284414 discloses a steering wheel with an airbag device. The airbag device includes a bag holder, which serves as a base. An airbag and an inflator for inflating and deploying the airbag are installed in the bag holder. Also, a pad is attached to the bag holder to cover the airbag. One end of each horn switch mechanism is connected to the bag holder. The other end of the horn switch mechanism is connected to a steering wheel body through a horn plate.

According to the structure of a horn switch mechanism disclosed in Japanese Laid-Open Patent Publication No. 2004-284414, coil spring units are placed between the bag holder and the horn plate. In this state, bolts are inserted to the coil spring units from a side of the horn plate that faces the steering wheel body. When the distal end of each bolt is passed through the coil spring unit and threaded to a seat of the bag holder. At the same time, the proximal end of the bolt is fixed to the horn plate, so that the horn mechanism is secured to the bag holder and the horn plate. On the other hand, the airbag and the pad are secured to a side of the bag holder opposite to the horn switch mechanism. Therefore, in the airbag device disclosed in Japanese Laid-Open Patent Publication No. 2004-284414, components other than the horn switch mechanisms are installed in accordance with the direction in which of the bolts of the horn switch mechanisms are assembled.

That is, a component that is at the lowermost position when viewed in the assembling direction of the bolts is the pad. Accordingly, the pad is first supported with its back side (side at which the airbag is accommodated and opposite side to the ornamental surface) facing upward. Then, while accommodating airbag in the pad, the bag holder is secured to the pad. Subsequently, horn switch mechanisms and a horn plate are secured to the bag holder. Then, a coil spring unit is arranged between the bag holder and the horn plate. The distal end of each bolt inserted in the horn plate is passed through the coil spring unit and threaded to the seat of the bag holder. This is how the proximal end of each bolt is fixed to the horn plate.

However, in this method, where the pad is supported while being installed, the manner in which the pad is supported needs to be changed for pads having different shapes. Since the pad has an ornamental surface, its shape varies in accordance with the type of car. Thus, when assembling the airbag device, a plurality of methods for supporting the pad need to be prepared in accordance with the type of car.

SUMMARY OF THE INVENTION

A first objective of the present invention is to provide a steering wheel with an airbag device that adds to the flexibility in the structure for securing horn switch mechanisms. A second objective of the present invention is to provide a steering wheel with an airbag device that reduces the size of the airbag device. Further, a third objective of the present invention is to provide a steering wheel with an airbag device that is easy to install, and a method for assembling the steering wheel.

To achieve the foregoing objective, a steering wheel with an airbag device that is assembled with a steering wheel body together with a horn switch mechanism is provided. The steering wheel includes a bag holder, a pad, and a switch support portion. The bag holder is provided in the airbag device. The horn switch mechanism is secured to the bag holder. The pad is secured to the bag holder. A bag accommodation space for accommodating a folded airbag is defined between the bag holder and the pad. An attachment hole is formed in the bag holder. The horn switch mechanism is inserted in and secured to the attachment hole. The switch support portion is provided in the pad and supports the horn switch mechanism.

In accordance with a second aspect of the present invention, a steering wheel with an airbag device that is assembled with a steering wheel body together with a horn switch mechanism is provided. The steering wheel includes a bag holder and a pad. The bag holder is provided in the airbag device. The horn switch mechanism is secured to the bag holder. The pad is secured to the bag holder. A bag accommodation space for accommodating a folded airbag is defined between the bag holder and the pad. At least a part of the horn mechanism is arranged to protrude into the accommodation space. The horn switch mechanism has a cover member that covers the part that protrudes into the bag accommodation space.

In accordance with a third aspect of the present invention, a steering wheel with an airbag device that is assembled with a steering wheel body together with a horn switch mechanism is provided. The airbag device includes, a bag holder, an air bag secured to the bag holder, an inflator that inflates and deploy the airbag, and a pad covering the airbag. The horn switch mechanism includes a support portion, a movable attachment portion, and an urging member. The support portion has an assembling portion that is secured to the steering wheel body. The movable attachment portion is movably attached to the support member. The movable attachment portion is secured to the bag holder. The urging member is engaged with the movable attachment member. The urging member applies an urging force to the movable attachment member and to a portion that is displaced relative to the movable attachment member. The urging member maintains the position of the airbag device through the movable attachment member, and holds switch contacts in the horn switch mechanism such that these are separate from each other. An attachment hole is formed in the bag holder. The assembling portion and the urging member are inserted in the attachment hole from the pad toward the steering wheel body, and the movable attachment member is secured to the attachment hole. In the horn switch mechanism, the movable attachment member is secured to the attachment hole of the bag holder, and the assembling portion of the support member is secured to the steering wheel body.

In accordance with a fourth aspect of the present invention, a method for assembling the steering wheel according to the third aspect is provided. The method includes: securing the movable attachment member of the horn switch mechanism to the bag holder by inserting the support member of the horn switch mechanism and the urging member into the attachment hole of the bag holder; and assembling the airbag and the pad with the bag holder in the same direction along which the horn switch mechanism is assembled with the bag holder.

BRIEF DESCRIPTION OF THE DRAWINGS

FIG. 8 is a diagrammatic view showing an installed state of the horn switch mechanism;

FIG. 9 is a diagrammatic view showing an installed state of the horn switch mechanism;

FIGS. 10A to 10D are plan views showing switch support portions according to modifications of the first embodiments;

DETAILED DESCRIPTION OF THE PREFERRED EMBODIMENTS

First Embodiment

A first embodiment of the present invention will now be described with reference to FIGS. 1 to 10.

Figure 1:
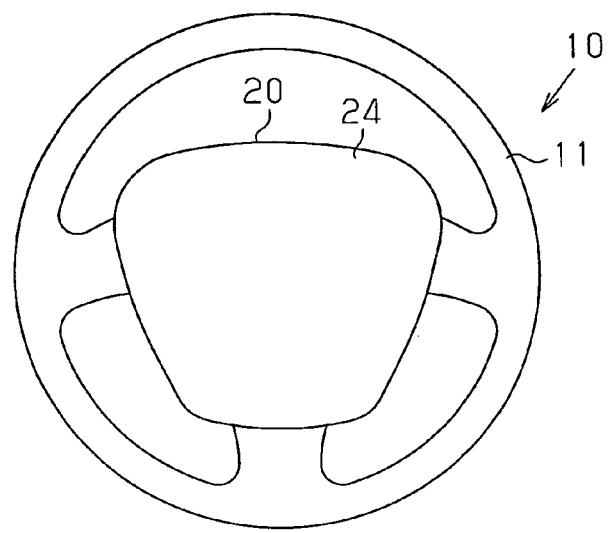
FIG. 1 is a front view showing a steering wheel according to a first embodiment of the present invention.
Figure 2:
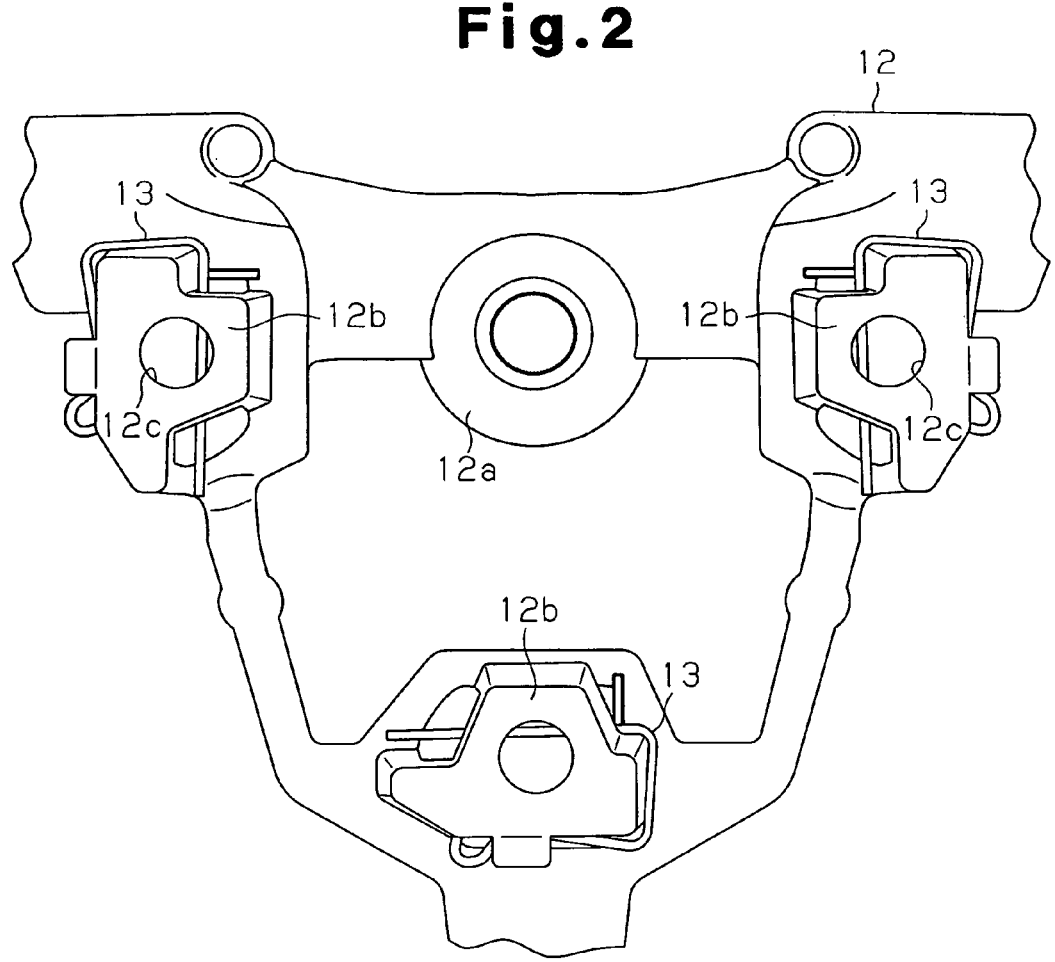
FIG. 2 is a front view showing a portion of the steering wheel body.

As shown in FIG. 1, a steering wheel 10 has an airbag device (an airbag module) 20 incorporated therein. The airbag device 20 is located at a center of an steering wheel body 11, which is held by the driver. As shown in FIG. 2, the steering wheel body 11 is fixed to a steering shaft (not shown) through a boss 12*a* of a metal core 12. Three attachment portions 12*b* are arranged around the boss 12*a* to attach the airbag device 20. Two of the attachment portions 12*b* are arranged at opposite sides of the boss 12*a* in such a manner that the boss 12*a* is located between the attachment portions 12*b*. The other one of the attachment portions 12*b* is arranged below the boss 12*a*. A clip 13 is mounted in each of the attachment portions 12*b*. A horn switch mechanism 15 (see FIG. 3), which supports the airbag device 20 and functions as a horn switch, is mounted in each attachment portion 12*b*. Each horn switch mechanism 15 is attached with a snap-fit structure including the clip 13. The airbag device 20 is supported by the metal core 12 of the steering wheel body 11 through the horn switch mechanisms 15.

Figure 3:
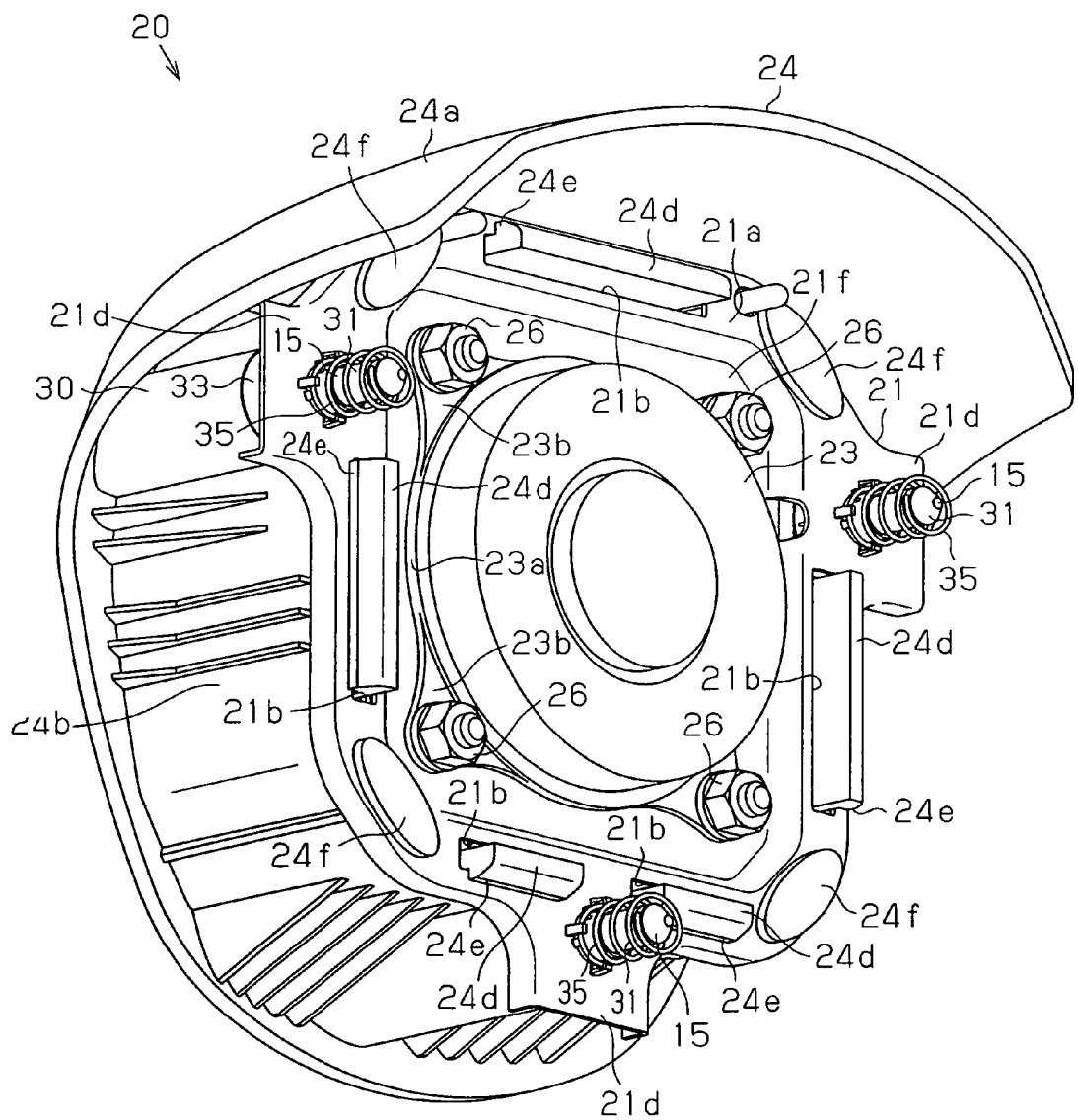
FIG. 3 is a rear perspective view showing an airbag device.
Figure 4:
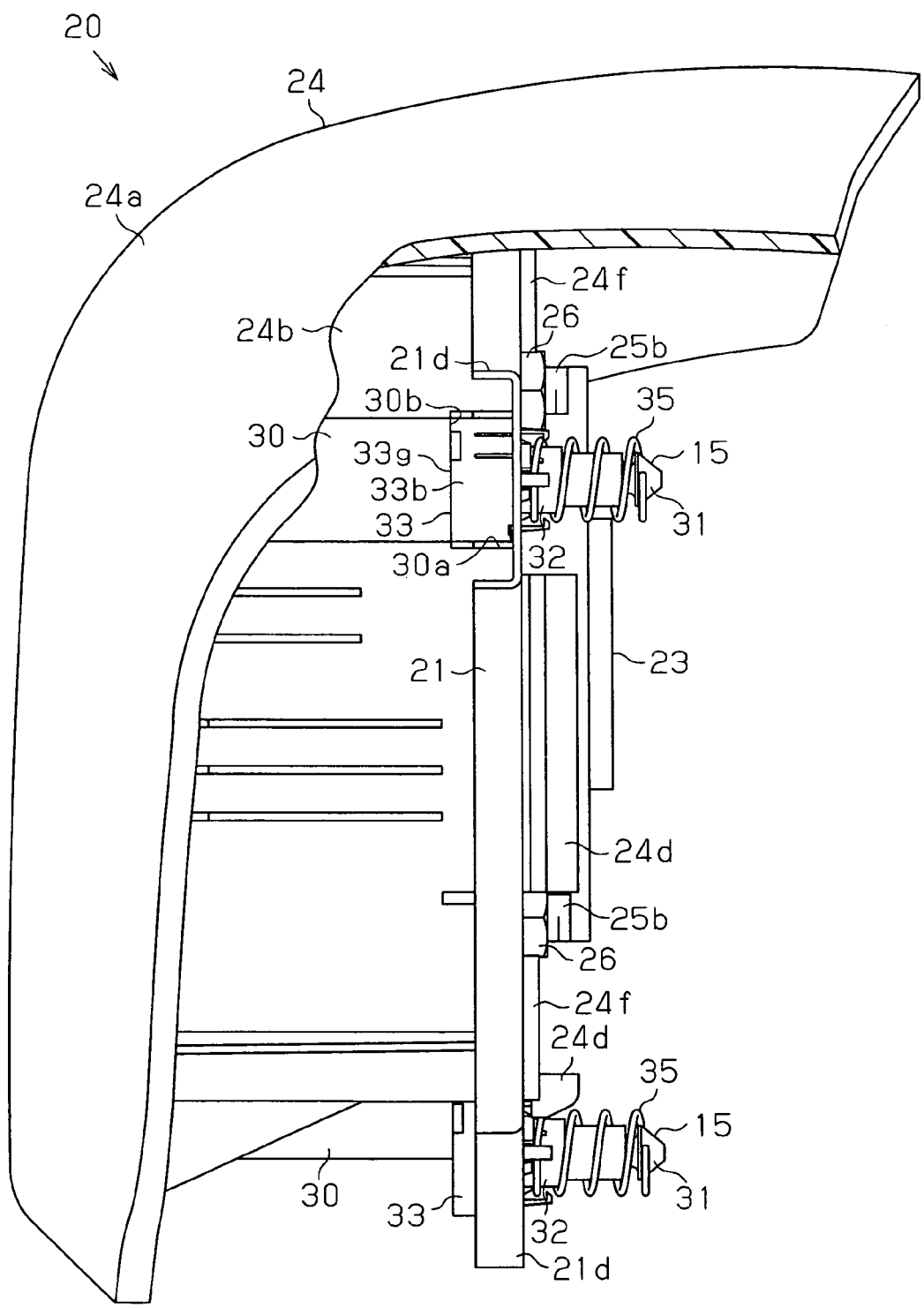
FIG. 4 is a side view showing the airbag device.
Figure 5:
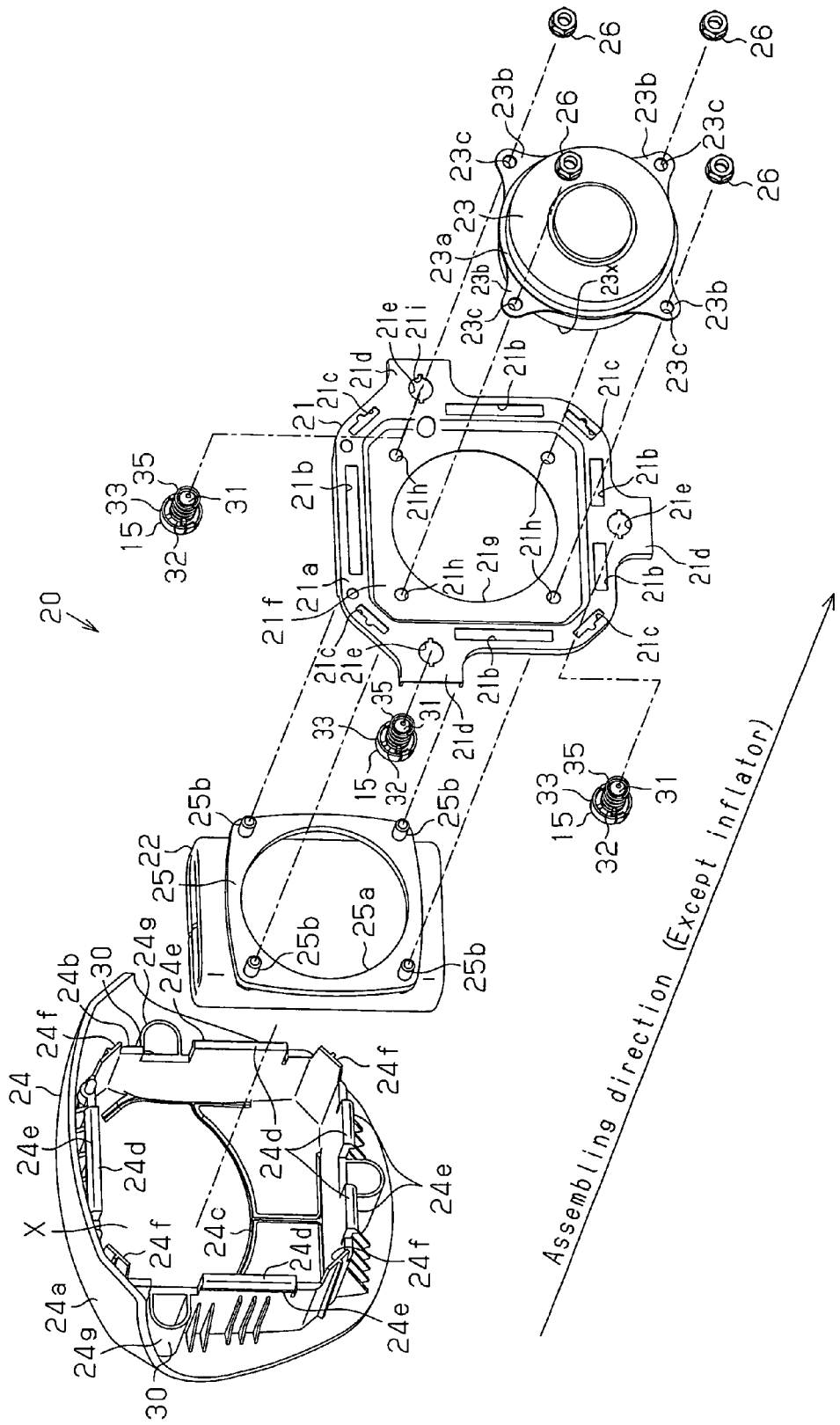
FIG. 5 is an exploded perspective view showing the airbag device.

As shown in FIGS. 3, 4, and 5, the airbag device 20 has a bag holder 21, an airbag 22, an inflator 23, and a pad 24. The bag holder 21 is formed by pressing a metal plate and has a substantially rectangular shape. A periphery fixing portion 21*a*, which has a substantially rectangular loop shape and is used for securing the pad 24, is formed in the peripheral portion of the bag holder 21.

The pad 24 is molded from resin. The pad 24 has an outer cover 24*a*, which forms an ornamental surface, and an accommodation wall 24*b* extending from the backside of the outer cover 24*a*. The accommodation wall 24*b* has a substantially rectangular loop shape. The accommodation wall 24*b*, together with the inner surface of the outer cover 24*a* and the bag holder 21, define a bag accommodation space (hereinafter, simply referred to as an accommodation space) X in which the airbag 22 is accommodated. A thin portion 24*c*, which is to be torn apart when the airbag 22 is inflated and deployed, is formed in a portion of the outer cover 24*a*.

Five engagement claws 24*d*, each of which has a rectangular plate-like shape, are formed integrally with the end surface of the accommodation wall 24*b*. Specifically, one of the engagement claws 24*d* is arranged on the upper wall portion of the accommodation wall 24*b*, another one is arranged on the left wall portion, and another one is arranged on the right wall portion. The other two of the engagement claws 24*d* are provided on the lower wall portion of the accommodation wall 24*b*. The engagement claws 24*d* each have predetermined length and width. An engagement projection 24e is formed at the distal end of each engagement claw 24d. The engagement projection 24e projects outward from the outer surface of the distal end of each engagement claw 24d. A rectangular plate-like swaging piece 24f is formed integrally with an end surface located at each corner of the accommodation wall 24b.

Claw engaging holes 21b are formed in the periphery fixing portion 21a of the bag holder 21 at positions corresponding to the engagement claws 24d of the pad 24. Specifically, one of the claw engaging holes 21b is formed in the upper side, another one is formed in the left side, another one is formed in the right side, and the other two formed in the lower side. Each claw engaging hole 21b is a slit extending along the corresponding side of the bag holder 21. The distal ends of the engagement claws 24d are passed through and engaged with the claw engaging holes 21b. Specifically, each engagement claw 24d is inserted through the corresponding engagement hole 21b in a state flexed inwardly by the amount corresponding to the width of the associated engagement projection 24e. After being passed through the engagement holes 21, the engagement claws 24d then restore their original shape and thus become engaged with the edges of the claw engaging holes 21b. This prevents the engagement claws 24d from coming off in a direction opposite to the insertion direction.

Through holes 21c for swaging, through which the swaging pieces 24f are passed, are formed in the corners of the bag holder 21. Each one of the through holes 21c receives one of the swaging pieces 24f. Afterwards, heat swaging is performed by heating and deforming the distal ends of the swaging pieces 24f (see FIG. 3). The pad 24 is thus fixed to the bag holder 21 through the heat swaging of the swaging pieces 24f and engagement of the engagement claws 24d.

A substantially square seat 21f is formed at a position inward from the periphery fixing portion 21a of the bag holder 21. A circular opening 21g is formed at the center of the seat 21f. Four screw insertion holes 21h are formed in the corners of the square seat 21f and at positions around the opening 21g. The screw insertion holes 21h are located on diagonal lines on the seat 21f. A columnar inflator 23 is received by and attached to the opening 21g of the seat 21f.

The inflator 23 has a columnar body and a flange 23a formed at the periphery of the body. Four attachment pieces 23b are formed in the flange 23a to extend further radially outward. The four attachment pieces 23b are spaced apart at equal angular intervals at the periphery of the flange 23a. Screw insertion holes 23c are formed in the respective attachment pieces 23b in correspondence with the screw insertion holes 21h of the bag holder 21. The inflator 23 has a gas outlet 23x for ejecting inflation gas on a side that faces the flange 23a. The inflator 23 is passed through the opening 21g of the bag holder 21 in such a manner that the gas outlet 23x projects into the bag accommodation space X. With the flange 23a held in contact with the edge of the opening 21g, the inflator 23 is attached to the bag holder 21 together with a ring retainer 25.

The ring retainer 25 has a circular opening 25a. The opening 25a has the same shape as the opening 21g of the bag holder 21, through which the gas outlet 23x of the inflator 23 is inserted. The ring retainer 25 has four attachment screws 25b, which are passed through the corresponding screw insertion holes 21h of the bag holder 21. The opening of the folded airbag 22 is attached to the ring retainer 25. The ring retainer 25, to which the airbag 22 is attached, is fixed to the bag holder 21 by passing the attachment screws 25b through the screw insertion holes 21h, 23c of the bag holder 21 and the inflator 23, and threading the nuts 26 to the screws 25b. This fixes the airbag 22 to the bag holder 21 through the ring retainer 25 and, simultaneously, fixes the inflator 23 to the bag holder 21.

Attachment portions 21d, to which the horn switch mechanisms 15 are attached, are formed in the periphery fixing portion 21a of the bag holder 21. Two of the attachment portions 21d are arranged in the left side and the right side of the periphery fixing portion 21a, respectively, and each of these two is located between a claw engaging hole 21b and an insertion hole 21c. The other one of the attachment portions 21d is located between the two claw engaging holes 21b in the lower side of the periphery fixing portion 21a. An attachment hole 21e, through which the corresponding horn switch mechanism 15 is attached, is formed in each of the attachment portion 21d. A metal securing pin 31 and a coil spring 35 fitted about the pin 31, which form a horn switch mechanism 15, are received by each attachment hole 21e. The attachment holes 21e each have a size that allows a movable attachment member 32 fixed to the upper end of the securing pin 31 to be attached. Each attachment hole 21e of the bag holder 21 is occupied by the corresponding horn switch mechanism 15. That is, each attachment hole 21e is located at a position that corresponds to the associated horn switch mechanism 15. In correspondence with the positions of the horn mechanisms 15, the positions of the attachment holes 21e may be either inside or outside of the accommodation space X when viewed from front.

Switch support portions 30 for supporting the horn switch mechanisms 15 are formed in the pad 24. The switch support portions 30 are formed at positions facing the attachment portions 21d of the bag holder 21. With reference to FIG. 5, the switch support portions 30 are formed integrally with the accommodation wall 24b of the pad 24. Also, the switch support portions 30 extend from the backside of the outer cover 24a of the pad 24. Specifically, the switch support portions 30 project outward from the accommodation wall 24b (with respect to the bag accommodation space X). The switch support portions 30 are bent in U shapes as viewed from the front (in the direction along the axis L of the pad 24). Each switch support portion 30 is hollow. Each of the switch support portions 30 is connected to the accommodation wall 24b at the opening of the U shape. The end face of the bent portion of each switch support portion 30 and the adjacent accommodation wall 24b are flush with each other. The curved portion and the end face of the accommodation wall 24b serve as a contact surface 30b, which contacts an upper surface 33g of a cap member 33, which forms one of the horn switch mechanisms 15. The switch support portions 30 also function as ribs that reinforce the accommodation wall 24b.

In a portion of each switch support portion 30 that faces the bag holder 21, a cutout portion 30a is formed (see FIG. 4), which extends from the edge of the accommodation wall 24b toward the outer cover 24a.

[Structure of Horn Switch Mechanism]

Figure 6:
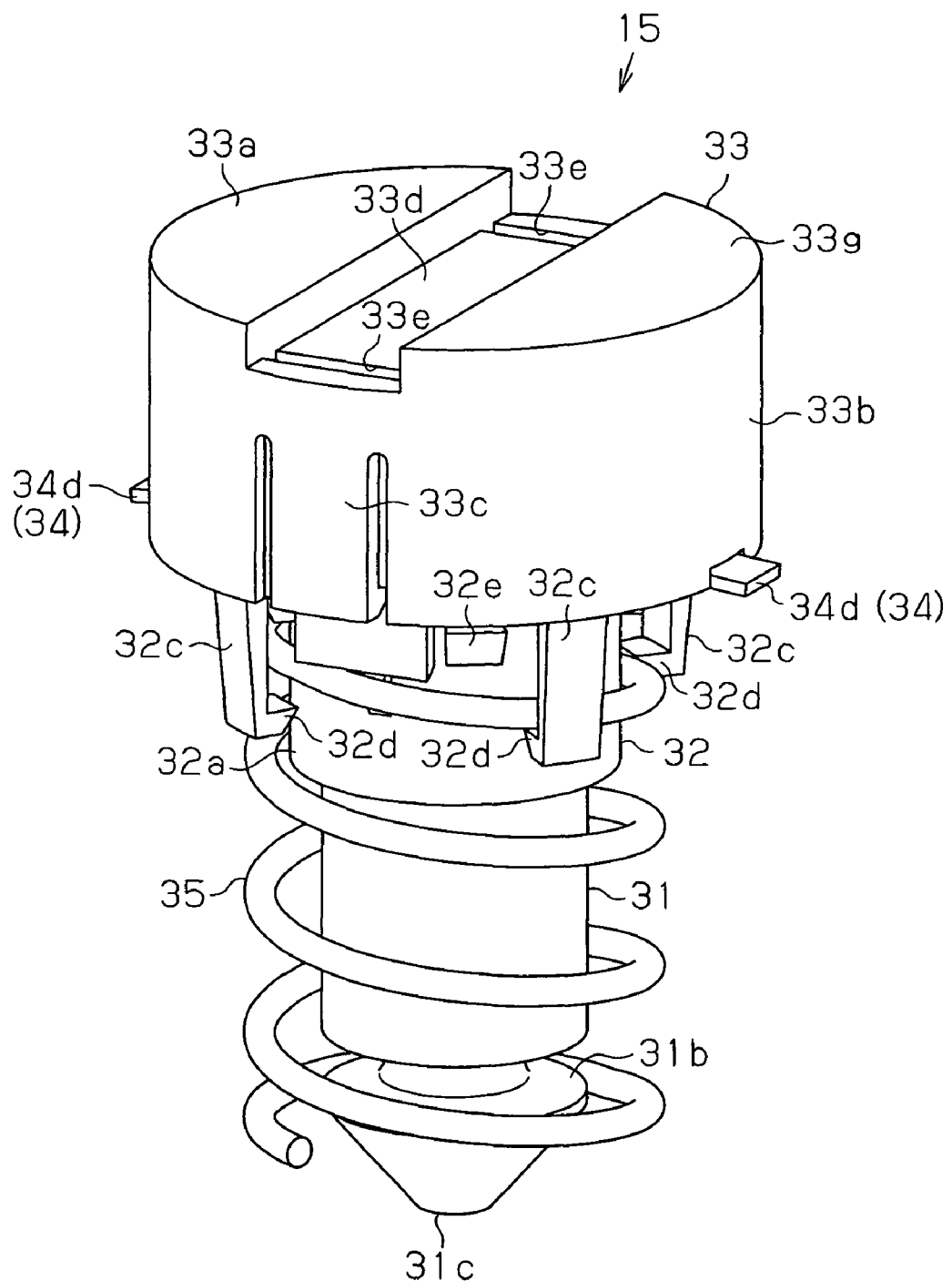
FIG. 6 is a perspective view showing a horn switch mechanism.
Figure 7:
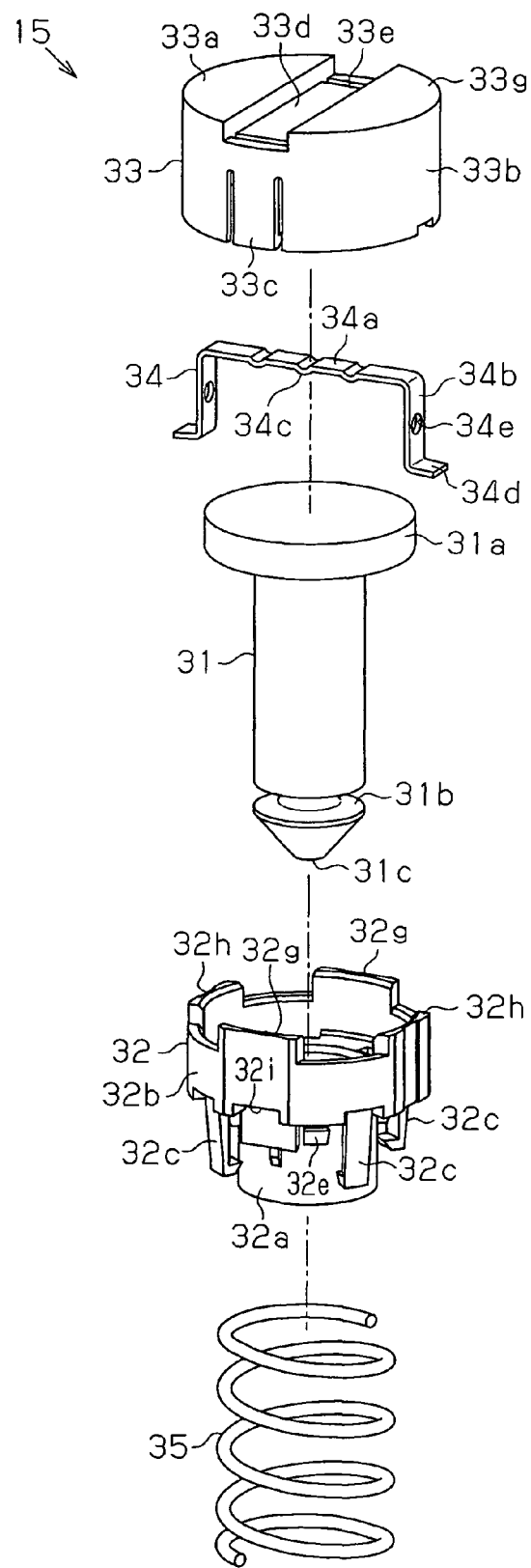
FIG. 7 is an exploded perspective view showing the horn switch mechanism.

The steering wheel 10 has three horn switch mechanisms 15. As illustrated in FIGS. 6 and 7, each of the horn switch mechanisms 15 has a metal securing pin 31 (support member) serving as a fixed contact, a resin movable attachment member 32, a resin cap member 33, a contact terminal 34 serving as a movable contact, and a coil spring 35 serving as an urging member. The cap member 33 is attached to the upper end of the movable attachment member 32, and the contact terminal 34 is located inside the cap member 33.

The securing pin 31 has a circular cross-section. A head 31a, which extends perpendicular to the axial direction of the securing pin 31, is formed at the upper end (the end facing the pad 24) of the securing pin 31. An engagement groove 31b is formed in the vicinity of the lower end of the securing pin 31 and over the entire circumference of the securing pin 31. Each securing pin 31 is passed through the corresponding insertion hole 12c of the metal core 12 (the steering wheel body 11). The clip 13 of the attachment portion 12b is engaged with the engagement groove 31b of the securing pin 31 (see FIG. 9). The securing pin 31 has a snap-fit structure that allows the pin 31 to be fixed to the attachment portion 12b simply by inserting the securing pin 31 into the insertion hole 12c. When the securing pin 31 is fixed to the attachment portion 12b, conduction between the securing pin 31 and the metal core 12 is permitted. The snap-fit structure refers to a structure that elastically secures the securing pin 31 at insertion. In the illustrated embodiment, snap-fit structures are employed in the fixing portion between each securing pin 31 and the metal core 12 and the fixing portion between each movable attachment member 32 and the bag holder 21.

Each movable attachment member 32 is formed as a cylinder with a step. The movable attachment member 32 is joined to the securing pin 31 in a manner movable along the longitudinal direction of the securing pin 31. The movable attachment member 32 has a tubular portion 32a through which the securing pin 31 is inserted. A fitting portion 32b is formed at the upper end of the tubular portion 32a. The head 31a of the securing pin 31 is engaged with the fitting portion 32b. The fitting portion 32b contacts the lower surface and the outer circumferential surface of the head 31a of the securing pin 31. The fitting portion 32b has a larger diameter than the attachment hole 21e of the bag holder 21. The cap member 33 is attached to the fitting portion 32b. The cap member 33 also has a larger diameter than the attachment hole 21e. This forms a come-off prevention structure that prevents the horn switch mechanisms 15 from coming off the pad 24 toward the steering wheel body 11 through the attachment holes 21e. Further, the head 31a of the securing pin 31, which is a rigid body, has a larger diameter than the attachment hole 21e. This ensures the come-off preventing performance.

A pair of contact projections 32g and a pair of holding projections 32h are formed at the upper end of the fitting portion 32b. The contact projections 32g contact an inner surface of the cap member 33. The holding projections 32h cooperate with the cap member 33 to clamp and hold the contact terminal 34. The contact projections 32g and the holding projections 32h are spaced apart at equal intervals along the periphery of the fitting portion 32b.

Spring holding portions 32c are formed in the movable attachment member 32. Before the horn switch mechanism 15 (the securing pin 31) is joined to the metal core 12 (see FIGS. 6 and 3), the spring holding portions 32c hold the coil spring 35. Four spring holding portions 32c (only two are shown in FIGS. 6 and 7) are formed in the movable attachment member 32 and spaced apart at equal intervals along the periphery of the movable attachment member 32. Each of the spring holding portions 32c extends downward from the fitting portion 32b. An engagement projection 32d, which projects toward the tubular portion 32a, is formed at the lower end of each spring holding portion 32c. A clearance is provided between the spring holding portions 32c and the tubular portion 32a. The spring holding portions 32c can flex in a radial direction (a direction perpendicular to the axis of the horn switch mechanism 15).

When each horn switch mechanism 15 is assembled, the upper end of the coil spring 35 is inserted into the clearance between the tubular portion 32a and the spring holding portions 32c of the movable attachment member 32. At this stage, the coil spring 35 is engaged with the engagement projections 32d of the spring holding portions 32c, and is thus retained by the movable attachment member 32 (see FIG. 6). As has been described, before the horn switch mechanism 15 is joined to the metal core 12, the upper end of the coil spring 35 is engaged with and held by the engagement projections 32d of the spring holding portions 32c. In other words, the lower end of the coil spring 35 is free. Therefore, it is unnecessary to temporarily hold the coil spring 35 in a compressed state.

Figures 8, 9:
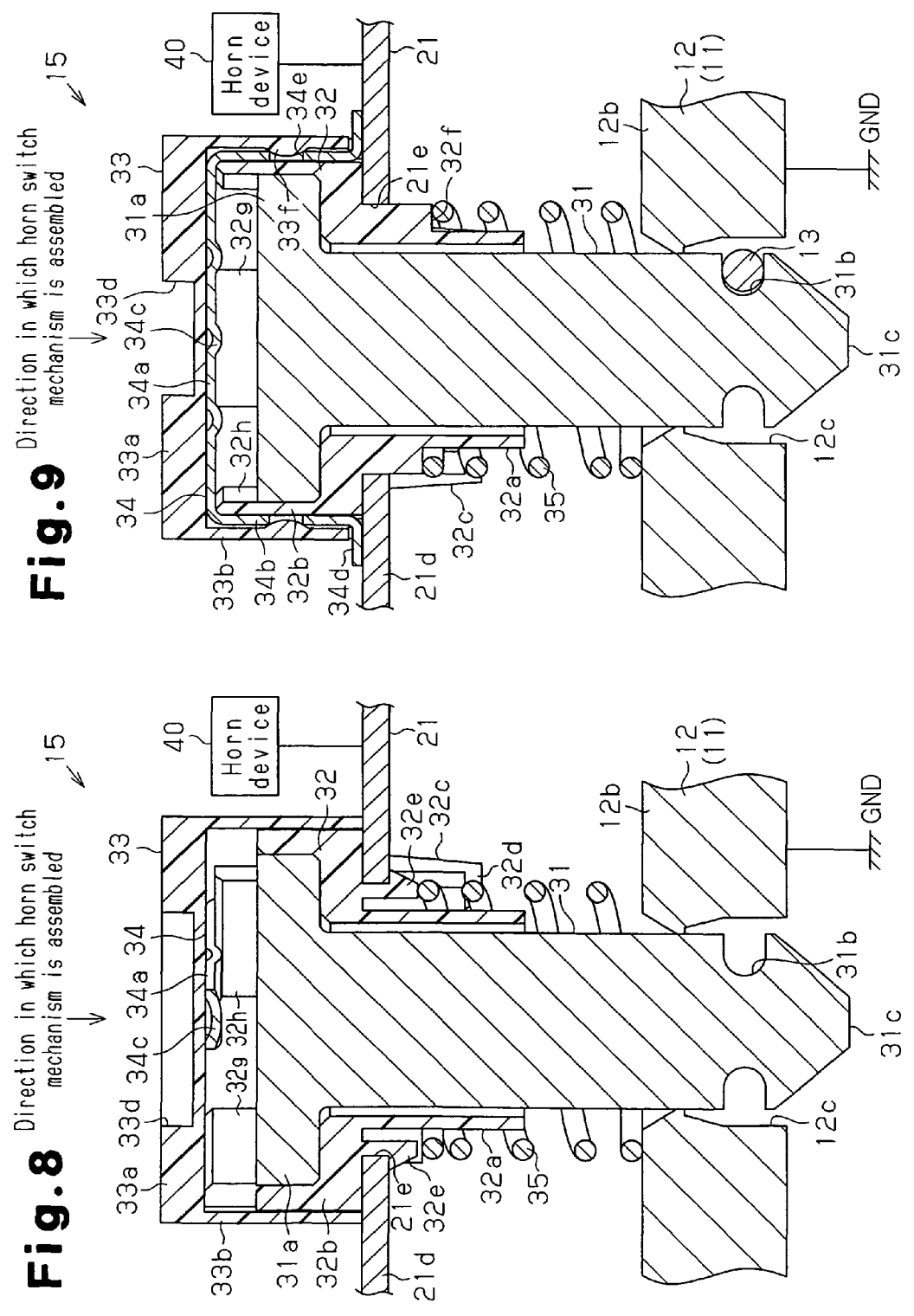

Holder engagement portions 32e, which extend downward from the fitting portion 32b, are formed in the movable attachment member 32. Four holder engagement portions 32e (only one is shown in FIGS. 6 and 7) are formed in the movable attachment member 32 and spaced apart at equal intervals along the periphery of the movable attachment member 32. The holder engagement portions 32e are arranged slightly offset from the spring holding portions 32c in the circumferential direction. A clearance is provided between the holder engagement portions 32e and the tubular portion 32a. The spring holding portions 32c are permitted to flex radially. After being received in the corresponding attachment hole 21e of the movable attachment member 32, the holder engagement portions 32e elastically restore their original shapes. The holder engagement portions 32e are each engaged with the lower surface of the bag holder 21 (see FIG. 8), achieving a snap-fit structure of the movable attachment member 32 with respect to the bag holder 21. FIG. 8 shows a cross section of each horn switch mechanism 15 including the holder engagement portions 32e, and FIG. 9 shows a cross section of the horn switch mechanism 15 taken along the longitudinal direction of the contact terminal 34.

The cap member 33 is joined to the fitting portion 32b of the movable attachment member 32 in such a manner as to cover the securing pin 31 and the movable attachment member 32. The cap member 33 has a disk-like upper portion 33a and a peripheral wall 33b. The peripheral wall 33b extends downward from the periphery of the upper portion 33a. The cap member 33 as a whole has a flattened shape with respect to the longitudinal direction of the horn switch mechanism 15. A pair of hook portions 33c (only one is shown in FIGS. 6 and 7), which are elastically deformable, are formed in the peripheral wall 33b of the cap member 33. The hook portions 33c are engaged with a lower surface 32i (see FIG. 7) of the fitting portion 32b of the movable attachment member 32. The upper portion 33a of the cap member 33 contacts the contact projections 32g of the movable attachment member 32. This immovably fixes the cap member 33 to the movable attachment member 32.

A groove 33d, by which the orientation of the cap member 33 is corrected when the cap member 33 is installed, is formed in an upper surface 33g of the upper portion 33a. Molding holes 33e for molding the undercut portions of the hook portions 33c are formed in the groove 33d at positions corresponding to the hook portions 33c. The molding holes 33e are closed by the contact projections 32g of the movable attachment member 32, which contacts the upper portion 33a of the cap member 33. This prevents foreign matter from entering the interior of the cap member 33 through the molding holes 33e. As a result, problems are prevented from occurring in electrical conduction between the securing pin 31 and the contact terminal 34.

The contact terminal 34 is arranged inside the cap member 33. As illustrated in FIGS. 7 and 9, the contact terminal 34 is formed by pressing a metal plate. The contact terminal 34 is formed by a linear upper portion 34a and a pair of side portions 34b extending from opposite ends of the upper portion 34a. The contact terminal 34 has a substantially U shaped cross section corresponding to the shape of the inner surface of the cap member 33. The contact terminal 34 is arranged in such a manner that the upper portion 34a extends perpendicular to the axis of the horn switch mechanism 15. An engagement hole 34e is formed in each of the side portions 34b of the contact terminal 34. Engagement projections 33f, which project from the inner surface of the cap member 33, are engaged with the corresponding engagement holes 34e. This holds the contact terminal 34 with respect to the inner peripheral surface of the cap member 33. Three contact projections 34c, which project toward the securing pin 31, are formed in the upper portion 34a of the contact terminal 34. The contact projections 34c are spaced apart at equal intervals in the longitudinal direction of the upper portion 34a of the contact terminal 34. The middle one of the contact projections 34c is provided at the center of the upper portion 34a of the contact terminal 34.

Each of the side portions 34b of the contact terminal 34 has a bent portion 34d, which is arranged at the lower end of the side portion 34b. Each one of the bent portions 34d extends outward from the associated one of the side portions 34b. The bent portions 34d contact the upper surface of the bag holder 21 (see FIG. 9). This permits mutual conduction between the bag holder 21 and the contact terminal 34. Before the horn switch mechanism 15 is joined to the bag holder 21, the angle defined by each bent portion 34d and the associated side portion 34b is greater than 90 degrees (95 degrees in the illustrated embodiment). When the horn switch mechanism 15 is joined to the bag holder 21, the bent portions 34d are reliably held in contact with the upper surface of the bag holder 21. When the horn switch mechanism 15 is installed, the angle between each bent portion 34d and the associated side portion 34b is substantially 90 degrees. The fitting portion 32b of the movable attachment member 32 is arranged between each side portion 34b and the securing pin 31. This ensures insulation between the side portions 34b of the contact terminal 34 and the securing pin 31.

In each horn switch mechanism 15, the cap member 33, to which the contact terminal 34 is joined, is fixed to the movable attachment member 32. The securing pin 31 is installed in the movable attachment member 32 so as not to come off. The spring holding portions 32c of the movable attachment member 32 hold the coil spring 35. In other words, the horn switch mechanism 15 is an assembly formed by unitizing the securing pin 31, the movable attachment member 32, the cap member 33, the cap member 33, the contact terminal 34, and the coil spring 35 (see FIG. 6). Accordingly, when the horn switch mechanism 15 is installed or replaced, the horn switch mechanism 15 can be handled as an integral assembly. Further, the securing pin 31 is installed in the movable attachment member 32 so as not to come off and joined to the bag holder 21 through the movable attachment member 32. This prevents the bag holder 21 (the airbag device 20) from coming off the securing pin 31.

Each unitized horn switch mechanism 15 is inserted through the corresponding attachment hole 21e of the bag holder 21 and thus fixed. Each attachment hole 21e of the bag holder 21 is shaped circular in correspondence with the shape of the tubular portion 32a of the movable attachment member 32. Each attachment hole 21e has recesses 21i (see FIG. 5), which extend radially outward. Each attachment hole 21e has four recesses 21i, which are spaced apart at equal intervals along the periphery of the attachment hole 21e. The recesses 21i receive the spring holding portions 32c of the movable attachment member 32. The recesses 21i of the attachment hole 21e determines the circumferential position of the movable attachment member 32 inserted in the attachment hole 21e.

By inserting each movable attachment member 32 through the corresponding attachment hole 21e, the holder engagement portions 32e are engaged with the lower surface of the bag holder 21, as illustrated in FIG. 8. This allows the movable attachment member 32 to move with the bag holder 21 when the bag holder 21 is moved downward (toward the metal core 12). The upper surface of the bag holder 21 contacts the lower end of the peripheral wall 33b of the cap member 33 and the lower ends of the hooks 33c of the cap member 33. The horn switch mechanism 15 clamps the bag holder 21 between the holder engagement portions 32e and the cap member 33. This configuration allows the movable attachment member 32, the cap member 33, and the contact terminal 34 to move together with the bag holder 21. Also, the movable attachment member 32, the cap member 33, and the contact terminal 34 are movable relative to the securing pin 31. The diameter of each attachment hole 21e is smaller than the diameter of the head 31a of each securing pin 31. This prevents the securing pin 31 from coming off the attachment hole 21e.

In a state where the airbag device 20 is assembled as a module as shown in FIG. 4, the upper surface 33g of each cap member 33 contacts the contact surface 30b of the corresponding switch support portion 30. That is, the cap member 33 is held between the switch support portion 30 of the pad 24 and the bag holder 21. Thus, when the airbag device 20 is secured to the metal core 12, or when the airbag device 20 is struck hard, the cap members 33 are prevented from being pushed toward the pad 24 through the securing pins 31. Thus, the cap members 33 do not come off the movable attachment members 32. That is, the switch support portions 30 receive load that acts on the horn switch mechanism 15 when the airbag device 20 is installed in the metal core 12 or when the airbag device 20 is struck hard. Therefore, the load acting on the horn switch mechanisms 15 is reduced without fastening the horn switch mechanisms 15, for example, with bolts. This adds to the flexibility in design of the structure for securing the horn switch mechanisms 15.

The horn switch mechanisms 15 are arranged to cover the cutout portions 30a of the accommodation wall 24b. This prevents the airbag 22 from being protruding from the cutout portions 30a when being inflated. Also, foreign matter (for example, nuts 26 for securing the inflator 23) is prevented from entering the accommodation space X through the cutout portions 30a. When the airbag device 20 is fastened to the metal core 12 using bolts and nuts, the bolts and nuts are prevented from entering the accommodation space X through the cutout portions 30a.

As illustrated in FIGS. 3 and 4, before the airbag device 20 is secured to the metal core 12, the springs 35 and the securing pins 31 passing through the springs 35 protrude from the bag holder 21 in a direction away from the pad 24. The securing pins 31 are passed through the insertion holes 12c of the corresponding attachment portions 12b (see FIG. 2) and thus fixed to the attachment portions 12b. The airbag device 20 is thus secured to the metal core 12. When fixed to the metal core 12, the securing pins 31 support the airbag device 20 (the bag holder 21) through the movable attachment member 32, such that the airbag device 20 can approach and move away from the metal core 12.

Before the airbag device 20 is installed, the distal ends 31c of the securing pins 31 project from the lower ends of the corresponding coil springs 35. Accordingly, when the airbag device 20 is joined to the metal core 12, the airbag device 20 is positioned by engaging the distal end 31c of each securing pin 31 with the corresponding insertion hole 12c of the metal core 12.

By inserting each securing pin 31 through the corresponding insertion hole 12c, the lower end of the associated coil spring 35 is brought into contact with the metal core 12 (the corresponding attachment portion 12b). By fixing the securing pin 31, the coil spring 35 is held in a compressed state between the movable attachment member 32 and the metal core 12. The compressed state refers to state where the airbag device 20 is allowed to move toward the metal core 12. In this compressed state, a horn stroke is secured from the position at which the contact terminals 34 separate from the securing pins 31 (the state in which the horn switch mechanisms 15 are turned off) to the position at which the airbag device 20 is pressed against the metal core 12 and the contact terminals 34 to contact the securing pins 31 (the state in which the horn switch mechanisms 15 are turned on). In this assembled state (see FIG. 9), the upper end of each coil spring 35 contacts a step 32f, which is formed in the tubular portion 32a of the movable attachment member 32. In this state, the coil spring 35 urges the movable attachment member 32 away from the metal core 12. In this manner, the coil springs 35 support the airbag device 20 as a whole through the movable attachment member 32 in such a manner that the contact terminal 34 and the securing pin 31 are separate from each other.

When the airbag device 20 is depressed against the steering wheel body 11, at least on of the movable attachment members 32 is pressed together with the bag holder 21, and moved toward the metal core 12 (downward as viewed in FIG. 9). At this stage, the cap member 33 moves toward the metal core 12 together with the bag holder 21 and the movable attachment member 32. At least one of the three contact projections 34c of the contact terminal 34 contacts the upper surface of the securing pin 31. This permits electrical conduction between the metal core 12, which is connected to the ground GND (the vehicle body ground), and the bag holder 21 through the securing pin 31 and the contact terminal 34. As a result, a horn device 40 (a horn) of the vehicle, which is electrically connected to the bag holder 21, is activated. In other words, each of the securing pins 31 supporting the airbag device 20 functions also as fixed contact that contacts the contact terminal 34 serving as a movable contact. This reduces the number of components of the airbag device 20, compared to an airbag device in which a support member of the airbag device 20 and a fixed contact member of the horn switch mechanism 15 are provided independently from each other.

It is preferred that the three contact projections 34c of the contact terminal 34 of each horn switch mechanism 15 be aligned in a radial direction (along a radial line) of the steering wheel 10. This configuration ensures electrical conduction between the contact terminal 34 and the upper surface of the securing pin 31. In the illustrated embodiment, three horn switch mechanisms 15 are provided and the horn switch mechanisms 15 are separated from the center of the steering wheel 10 by equal distances. This further ensures the electrical conduction between the contact terminal 34 and the upper surface of the securing pin 31.

When the airbag device 20 is assembled, the bag holder 21 is arranged in such a manner that the surface of the bag holder 21 facing the pad 24 faces upward. The horn switch mechanisms 15, the ring retainer 25, the airbag 22, and the pad 24 are assembled with the bag holder 21 from above. Then, the assembly is reversed and then the inflator 23 is joined to the bag holder 21.

Next operational advantages of the first embodiment of the present invention will be described.

(1) The horn switch mechanisms 15 are installed by being inserted in the attachment holes 21e of the bag holder 21. The pad 24 has the switch support portions 30 for supporting the horn switch mechanisms 15. Since the horn switch mechanisms 15 are supported by the switch support portions 30 of the pad 24, the horn mechanisms 15 do not need to be fastened with fasteners such as bolts. This reduces the load acting on the horn switch mechanisms 15. This adds to the flexibility in the structure for securing horn switch mechanisms 15.

(2) The movable attachment member 32 of each horn switch mechanism 15 has the holder engagement portions 32e, which are engaged with the edge of the attachment hole 21e. The movable attachment member 32 is secured to the bag holder 21 by the snap-fit structure including the holder engagement portions 32e. This facilitates the installment of the horn switch mechanism 15 in the bag holder 21.

(3) The switch support portions 30 are integrally formed with the accommodation wall 24b. The switch support portions 30 thus increases the strength of the accommodation wall 24b.

(4) The horn switch mechanisms 15 each include the securing pin 31 (support member) serving as a fixed contact, the movable attachment member 32, the cap member 33, the contact terminal 34, and the coil spring 35 serving as an urging member. The securing pin 31 is secured to the steering wheel body 11. The movable attachment member 32 is located in the attachment hole 21e of the bag holder 21 to be movable relative to the securing pine 31. The cap member 33 is located in the accommodation space X of the bag holder 21, and joined to the movable attachment member 32. The contact terminal 34 is held by the cap member 33. The coil spring 35 is engaged with the movable attachment member 32 and applies urging force to the movable attachment member 32 and to a portion that is moved relative to the movable attachment member 32. The coil springs 35 maintain the position of the airbag device 20 through the movable attachment members 32 and hold the contact terminals 34 and the securing pins 31 such that these are separate from each other. The cap member 33 is held between the switch support portion 30 and the bag holder 21. The horn switch mechanism 15 is therefore stably supported. The horn switch mechanism 15, which has the cap member 33 serving as a cover member, is formed as a single unit. Further, the securing pin 31 can function as a fixed contact of the horn switch mechanism 15. Thus, components such as a horn plate, which are required in the prior art, can be omitted. This reduces the number of components and the number of manufacturing steps.

(5) The fitting portion 32b of the movable attachment member 32 and the cap member 33 each have a larger diameter than the attachment hole 21e of the bag holder 21. This prevents the horn switch mechanism 15 from coming off the pad 24 toward the steering wheel body 11 through the attachment hole 21e. This reliably prevents the horn switch mechanisms 15 from falling off and the bag holder 21 from falling off the horn switch mechanisms 15. Further, the head 31a of the securing pin 31, which is located in the movable attachment member 32, is a rigid body and has a larger diameter than the attachment hole 21e. This further ensures the fall-off prevention.

(7) The cap member 33 has a flattened shape with respect to the longitudinal direction of the horn switch mechanism 15. This minimizes the reduction in volume of the accommodation space X caused by the cap member 33, which protrude into the accommodation space X. The horn switch mechanisms 15 are also prevented from hindering the inflation of the airbag 22.

(8) The bag holder 21 has the attachment holes 21e, to which the movable attachment members 32 of the horn switch mechanism 15 attached. Each attachment hole 21e receives the lower end of the securing pin 31 having the engagement groove 31b and the coil spring 35, from the pad 24 toward the steering wheel body 11 (the metal core 12). In this case, the airbag 22 (the ring retainer 25) and the pad 24 are assembled to the bag holder 21 in the same direction along which the horn switch mechanisms 15 are assembled. This allows the airbag device 20 to be installed with reference to the bag holder 21, which increases commonality of parts compared to a pad 24 having an ornamental surface. Therefore, commonality of means for supporting the bag holder 21 is achieved. This facilitates the installment of the airbag device 20.

(9) The fitting portion 32b and the cap member 33 each have a larger diameter than the attachment hole 21e. This prevents the horn switch mechanism 15 from coming off the pad 24 toward the steering wheel body 11 through the attachment hole 21e. This reliably prevents the horn switch mechanisms 15 from falling off and the bag holder 21 from falling off the horn switch mechanisms 15. Further, the head 31a of the securing pin 31, which is located in the movable attachment member 32, is a rigid body and has a larger diameter than the attachment hole 21e. This further ensures the fall-off prevention.

(10) While being placed about the securing pin 31, each coil spring 35 is held by the spring holding portion 32c of the movable attachment member 32. Since the securing pin 31 is inserted in the coil spring 35, the size of the horn switch mechanisms 15 is reduced. Also, since the coil spring 35 is held by the movable attachment member 32, the horn switch mechanism 15 can be handled as a single unit.

(11) The pad 24 has the switch support portions 30, which contact the horn switch mechanisms 15 when the airbag device 20 is assembled with the steering wheel body 11. The switch support portions 30 receive the assembling load applied by the horn switch mechanisms 15. Accordingly, when the airbag device 20 is installed, problems such as dropping off and damages of the horn switch mechanism 15 are prevented.

The first embodiment of the present invention may be modified as follows.

In the first embodiment, the switch support portions 30 are U-shaped. Instead, as shown in FIG. 10A, two plate-like portions 51 may be used that extend perpendicularly from the accommodation wall 24b in a direction away from the accommodation space X. As shown in FIG. 10B, switch support portions 30 having a circular shape when viewed from front may be used. In this case, half of the switch support portion 30 is located in side the accommodation wall 24b (the accommodation space X), and the other half is located outside the accommodation wall 24b. As shown in FIG. 10C, plus-shaped switch supporting portions 30 may be used. Also, T-shaped switch supporting portions 30 may be used. As shown in FIG. 10D, a part of the accommodation wall 24b that corresponds to a curved portion of the switch support portion 30 may be omitted, and an extension 52 that extends from the curved portion into the accommodation space X may be used. A portion of the accommodation wall 24b that corresponds to the curved portion of the switch support portion 30 may be formed to extend further toward the horn switch mechanism 15 than the curved portion of the switch support portion 30. The extension of the accommodation wall 24b may be fitted to the groove 33d of the cap member 33. This structure allows the switch support portion 30 (the accommodation wall 24b) to determine the position of the horn switch mechanisms 15.

In the first embodiment, the switch support portions 30 are located outside the accommodation wall 24b. Instead, the switch support portions 30 may be located inside the accommodation wall 24b (the accommodation space X). This structure reduces the size of the airbag device. Also, the switch support portion 30 may be formed to straddle the inside and the outside of the accommodation wall 24b.

In the first embodiment, the switch support portions 30 are integrally formed with the accommodation wall 24b. Instead, the switch support portions 30 may be located away from the accommodation wall 24b. The switch support portions 30 may be separately formed from the pad 24.

In the first embodiment, the number of the horn switch mechanism 15 and the switch support portions 30 each may be other than three, and may be one, two, or four or more.

In the first embodiment, the securing pins 31 of the horn switch mechanisms 15 are fixed to the metal core 12 of the steering wheel body 11, and can be moved relative to the airbag device 20. Instead, the securing pins 31 may be fixed to the airbag device 20, so that the securing pins 31 are movable relative to the metal core 12. Fixed contacts may be provided separately from the fixed pins 31.

In the first embodiment, the horn switch mechanisms 15 are secured to the bag holder 21 by a snap-fit structure. Instead, the horn switch mechanism 15 may be fastened to the bag holder 21 by bolts.

In the first embodiment, the claw engaging holes 21b and the attachment holes 21e are used as assembling portions for assembling the pad 24 and the horn switch mechanisms 15. Instead, other structures such as projections may be used as assembling portions. The positions of the claw engaging holes 21b and the attachment holes 21e may be changed as necessary.

In the first embodiment, one end of each coil spring 35 is engaged with the movable attachment member 32, and the other end is engaged with the bag holder 21. Instead, the other end of the coil spring 35 may be engaged with the securing pin 31.

In the first embodiment, one end of each coil spring 35 is engaged with the movable attachment member 32 on the lower surface of the bag holder 21. Instead, one end of the coil spring 35 may be engaged with the attachment hole 21e of the bag holder 21 or with the movable attachment member 32 on the upper surface of the bag holder 21. In this case, the clearance between the bag holder 21, that is, the airbag device 20, and the steering wheel body 11 is reduced. Also, displacement of the bag holder 21 in the horizontal direction due to inclination of the coil springs 35 is reduced. This improves the operability of the horn of the airbag device 20.

In the first embodiment, the horn switch mechanisms 15 each have a snap-fit structure, in which the mechanism 15 is fixed to the bag holder 21 simply by inserting the movable attachment member 32 into the attachment holes 21e. Instead, an extension that extends in a radial direction from the tubular portion 32a may be formed, and a recess that corresponds to the extension may be formed in the attachment hole 21e of the bag holder 21. In this case, after inserting the movable attachment member 32 into the attachment hole 21e while aligning the extension with the recess, the horn switch mechanism 15 is rotated so that the movable attachment member 32 is engaged with the lower surface of the bag holder 21.

In the first embodiment, the bag holder 21 is formed by pressing. Instead, the bag holder 21 may be formed by die casting.

Second Embodiment

A second embodiment of the present invention will now be described with reference to FIGS. 11 and 12. Like or the same reference numerals are given to those components that are like or the same as the corresponding components of the first embodiment.

Figure 11:
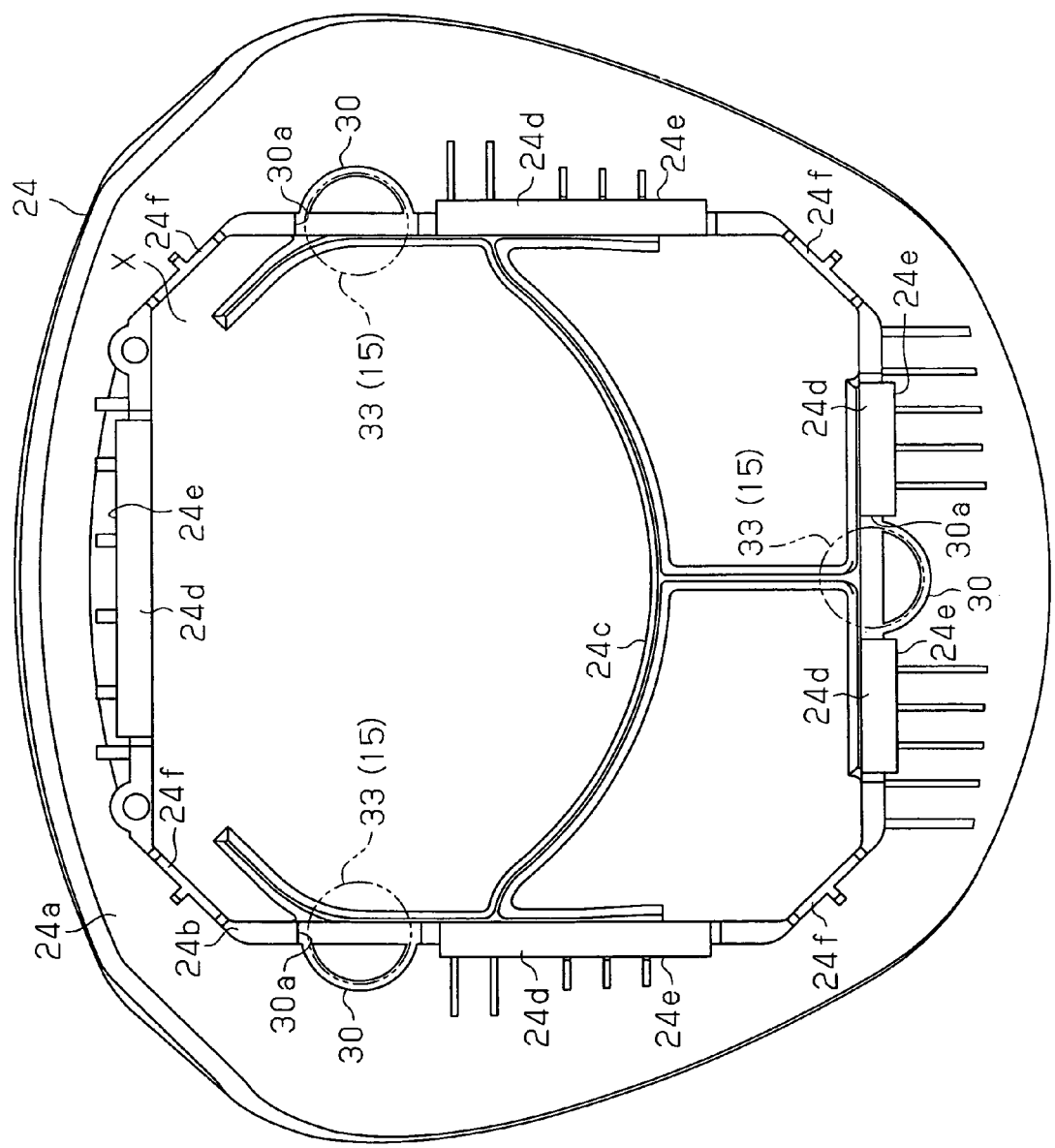
FIG. 11 is a plan view showing a pad according to a second embodiment of the present invention, as viewed from the back side.

As shown in FIG. 11, switch supporting portions 30 are integrally formed with an accommodation wall 24b. When viewed from front, each supporting portion 30 has a semi-circular shape and extends outward from the accommodation wall 24b (outside the accommodation space X). Each of the switch support portions 30 is connected to the accommodation wall 24b at the opening of the semi-circular shape.

In a state where an airbag device 20 is assembled as a module, the cap member 33 of each horn switch mechanism 15 is arranged to cover the cutout portion 30a of the accommodation wall 24b (the pad 24) as shown in FIG. 4. When viewed from front, substantially half of each cap member 33 is located inside the accommodation wall 24b of the pad 24, that is, in the accommodation space X. Therefore, when viewed from the front, substantially half of each horn switch mechanism 15 overlaps with the accommodation space X.

In the second embodiment, a part of each horn switch mechanism 15 that is located in the accommodation space X is covered with the resin cap member 33. The cap member 33 is substantially formed as a cylinder having no sharp edges. Therefore, when the airbag 22 is inflated, the influence of the horn switch mechanisms 15 on the airbag 22 is minimized. The arcuate portion of each cap member 33 projects into the accommodation space X. Accordingly, when inflated, the airbag 22 is prevented from being damaged by the cap members 33. In this manner, the second embodiment allows the horn switch mechanisms 15 to protrude into the accommodation space X, while preventing the horn switch mechanisms 15 from hindering the inflation of the airbag 22. As a result, the size of the airbag device 20 is reduced.

The cap member 33 is arranged in the cutout portion 30a of the accommodation wall 24b in the second embodiment. The outer circumferential surface of the cap member 33 contacts the cutout portion 30a, or there is a slight clearance for assembling between the outer circumferential surface and the cutout portion 30a. Thus, when inflated, the airbag 22 is prevented from protruding through the clearance between the cutout portion 30a and the cap member 33. Also, foreign matter is prevented from entering the accommodation space X through the cutout portions 30a.

Next operational advantages of the second embodiment of the present invention will be described.

(12) Each horn switch mechanism 15 is arranged to protrude into the accommodation space X, and includes the cap member 33 as a member that covers a portion that protrudes into the accommodation space X. Accordingly, when inflated, the airbag 22 is not damaged by the horn switch mechanisms 15. In this manner, the horn switch mechanisms 15 protrude into the accommodation space X, while being prevented from hindering the inflation of the airbag 22. As a result, the size of the airbag device 20 is reduced.

(13) The pad 24 has the accommodation wall 24b, which forms the accommodation space X, together with the bag holder 21. The horn switch mechanisms 15 are arranged to cover the cutout portions 30a of the accommodation wall 24b. A part of each horn mechanism 15 is arranged to protrude into the accommodation space X. This prevents the airbag 22 from being protruding from the cutout portions 30a when being inflated. Each horn switch mechanism 15 is arranged to partly, not entirely, protrude into the accommodation space X. This minimizes the reduction in volume of the accommodation space X.

The second embodiments of the present invention may be modified as follows.

Figure 12A:
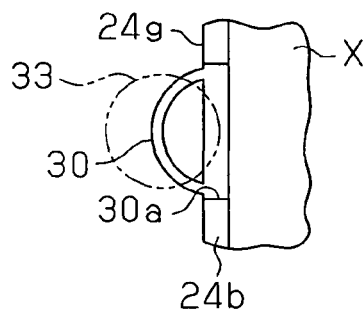
FIGS. 12A to 12C are diagrammatic plan views each showing the relationship between a horn switch mechanism and a bag accommodation space according a modification of the second embodiment.

In the second embodiment, substantially half of each cap member 33 protrudes into the accommodation space X. Instead, the entirety of each cap member 33 may be located in the accommodation space X. As shown in FIG. 12A, each cap member 33 may slightly protrude into the accommodation space X. As long as at least part of each cap member 33 is located in the accommodation space X, it is assumed that the cap member 33 protrudes into the accommodation space X.

Figure 12B:
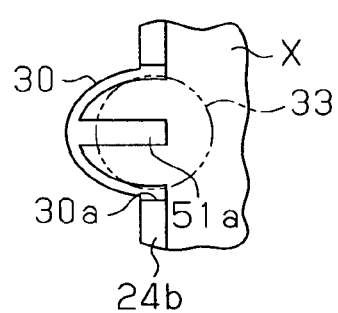
Figure 12C:
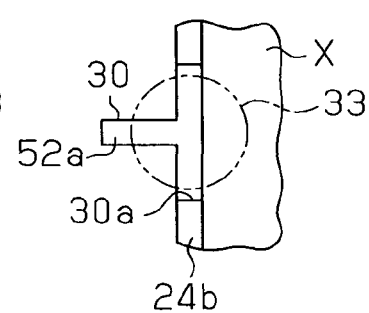

In the second embodiment, a part of the accommodation wall 24b that corresponds to a curved portion of the switch support portion 30 may be omitted, and an extension 51a that extends from the curved portion into the accommodation space X may be used as shown in FIG. 12B. As shown in FIG. 12C, a projection 52a may be employed that extends from the accommodation wall 24b away from the accommodation space X. A portion of the accommodation wall 24b that corresponds to the curved portion of the switch support portion 30 may be formed to extend further toward the horn switch mechanism 15 than the curved portion of the switch support portion 30. The extension of the accommodation wall 24b may be fitted to the groove 33d of the cap member 33. This structure allows the switch support portion 30 (the accommodation wall 24b) to determine the position of the horn switch mechanisms 15.

In the second embodiment, the shape of each cap member 33 may have any shape other than a cylindrical shape as long as it has no protrusions such as sharp edges.

The invention claimed is:

1. A steering wheel with an airbag device that is assembled with a steering wheel body together with a horn switch mechanism, the steering wheel comprising:
    a bag holder provided in the airbag device, the horn switch mechanism being secured to the bag holder;
    a pad secured to the bag holder;
    a bag accommodation space for accommodating a folded airbag being arranged between the bag holder and the pad;
    an attachment hole is formed in the bag holder, the horn switch mechanism being inserted in and secured to the attachment hole; and
    a switch support portion provided in the pad, the switch support portion supporting the horn switch mechanism, wherein:
    the pad has an outer cover and an accommodation wall extending from the outer cover,
    the outer cover, the accommodation wall and the bag holder define the bag accommodation space, and the bag accommodation space is enclosed by the outer cover, the accommodation wall and the bag holder, and
    the switch support portion is integrally formed with the accommodation wall and projects from a side surface of the accommodation wall.

2. The steering wheel according to claim 1, wherein the horn switch mechanism is assembled with the bag holder through a snap-fit structure having an engaging portion engaged with the edge of the attachment hole.

3. The steering wheel according to claim 1, wherein the horn switch mechanism includes:
    a support member serving as a fixed contact that is secured to the steering wheel body;
    a movable attachment member that is movably attached to the support member, the movable attachment portion being secured to the attachment hole of the bag holder;
    a cap member located in the bag accommodation space, the cap member being secured to the movable attachment member;
    a movable contact held by the cap member;
    an urging member engaged with the movable attachment member, wherein:

the urging member applies an urging force to the movable attachment member and to a portion that is displaced relative to the movable attachment member;

the urging member maintains the position of the airbag device through the movable attachment member, and holds the movable contact and the support member such that these are separate from each other; and the cap member is held between the switch support portion and the bag holder.

4. The steering wheel according to claim 3, wherein a part of the movable attachment member has a hole the diameter of which is greater than the attachment hole, the horn switch mechanism having a come-off prevention structure that prevents the horn switch mechanism from coming off the pad toward the steering wheel body through the attachment hole.

5. The steering wheel according to claim 1, wherein the switch support portion projects outside of the bag accommodation space.

6. A steering wheel with an airbag device that is assembled with a steering wheel body together with a horn switch mechanism, the steering wheel comprising:

a bag holder being provided in the airbag device, the horn switch mechanism being secured to the bag holder;

a pad being secured to the bag holder;

a bag accommodation space for accommodating a folded airbag being arranged between the bag holder and the pad, wherein:

at least a part of the horn mechanism is arranged to protrude into the accommodation space, and the horn switch mechanism has a cover member that covers the part of the horn switch mechanism that protrudes into the bag accommodation space, the pad has an accommodation wall that defines the bag accommodation space between the pad and the bag holder, and the horn switch mechanism is arranged to cover a cutout portion formed in the accommodation wall of the pad.

7. The steering wheel according to claim 6, wherein the horn switch mechanism is held by a switch support portion provided in the pad and the bag holder.

8. The steering wheel according to claim 6, wherein the horn switch mechanism includes:

a support member being secured to the steering wheel body;

a movable attachment member being movably attached to the support member, the movable attachment member being secured to the bag holder;

a cap member being located in the bag accommodation space, the cap member serving as a cover member and being secured to the movable attachment member;

a movable contact being held by the cap member;

an urging member being engaged with the movable attachment member, wherein:

the urging member applies an urging force to the movable attachment member and to a portion that is displaced relative to the movable attachment member;

the urging member maintains the position of the airbag device through the movable attachment member, and holds the movable contact and the support member such that these are separate from each other; and the airbag device is moved toward the steering wheel body against the urging force of the urging member, so that the movable contact contacts and is electrically connected with the support member, thereby activating the horn.

9. A steering wheel with an airbag device that is assembled with a steering wheel body together with a horn switch mechanism, wherein the airbag device includes:

a bag holder;

an air bag secured to the bag holder;

an inflator that inflates and deploys the airbag; and a pad covering the airbag, wherein the horn switch mechanism includes:

a support member having an assembling portion that is secured to the steering wheel body;

a movable attachment member that is movably attached to the support member, the movable attachment member being secured to the bag holder;

an urging member engaged with the movable attachment member;

the urging member applies an urging force to the movable attachment member and to a portion that is displaced relative to the movable attachment member;

the urging member maintains the position of the airbag device through the movable attachment member, and holds switch contacts in the horn switch mechanism such that these are separate from each other;

an attachment hole is formed in the bag holder, wherein the assembling portion and the urging member are inserted in the attachment hole from the pad toward the steering wheel body, and the movable attachment member is secured to the attachment hole; and in the horn switch mechanism, the movable attachment member is secured to the attachment hole, and the assembling portion of the support member is secured to the steering wheel body.

10. The steering wheel according to claim 9, wherein a part of the movable attachment member has a hole the diameter of which is greater than the attachment hole, the horn switch mechanism having a come-off prevention structure that prevents the horn switch mechanism from coming off the pad toward the steering wheel body through the attachment hole.

11. The steering wheel according to claim 9, wherein the movable attachment member is assembled with the bag holder through a snap-fit structure having an engaging portion engaged with the edge of the attachment hole.

12. The steering wheel according to claim 9, wherein the urging member is a coil spring, and the support member is inserted in the coil spring, whereby the coil spring is held by the movable attachment member.

13. The steering wheel according to claim 9, wherein a switch support portion that contacts the horn switch mechanism is provided in the pads and when the airbag device is assembled with the steering wheel body, the switch support portion receives a load from the horn switch mechanism.

14. A method for assembling the steering wheel according to claim 9, comprising:

securing the movable attachment member of the horn switch mechanism to the bag holder by inserting the support member of the horn switch mechanism and the urging member into the attachment hole of the bag holder; and assembling the airbag and the pad with the bag holder in the same direction along which the horn switch mechanism is assembled with the bag holder.

15. A steering wheel and airbag assembly comprising a steering wheel body assembled together with a horn switch mechanism, the steering wheel including:

a bag holder provided in the airbag device, the horn switch mechanism being secured to the bag holder;

a pad being secured to the bag holder; and a bag accommodation space for accommodating a folded airbag arranged between the bag holder and the pad:

the horn switch mechanism including:

a support member, wherein a part of the support member is arranged to protrude into the bag accommodation space and a remaining portion of the support member passes through the bag holder and is attached to the steering wheel body with a snap-fit structure, and the support member is movable within the bag accommodation space; and a cover member, wherein the cover member is arranged on a surface facing the bag accommodation space of the bag holder and the cover member covers the part of the support member the protrudes into the bag accommodation space.

* * * * *